United States Patent
Yamamoto et al.

(10) Patent No.: US 12,157,456 B2
(45) Date of Patent: Dec. 3, 2024

(54) VEHICLE

(71) Applicant: TOYOTA JIDOSHA KABUSHIKI KAISHA, Toyota (JP)

(72) Inventors: Shinsuke Yamamoto, Anjyo (JP); Satoru Tsurubuchi, Toyota (JP); Masanobu Horio, Tokyo-to (JP); Masaya Akita, Miyoshi (JP); Tomohiko Naka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 18/159,128

(22) Filed: Jan. 25, 2023

(65) Prior Publication Data

US 2023/0242116 A1    Aug. 3, 2023

(30) Foreign Application Priority Data

Feb. 2, 2022    (JP) .................................. 2022-014774

(51) Int. Cl.
| | |
|---|---|
| *B60W 10/06* | (2006.01) |
| *B60W 10/02* | (2006.01) |
| *B60W 10/04* | (2006.01) |
| *B60W 10/18* | (2012.01) |
| *B60W 30/18* | (2012.01) |

(52) U.S. Cl.
CPC ............ *B60W 10/06* (2013.01); *B60W 10/04* (2013.01); *B60W 10/18* (2013.01); *B60W 10/182* (2013.01); *B60W 30/18009* (2013.01); *B60W 30/18018* (2013.01); *B60W 30/18118* (2013.01); *B60W 10/02* (2013.01); *B60W 2510/0208* (2013.01); *B60W 2710/18* (2013.01)

(58) Field of Classification Search
None
See application file for complete search history.

(56) References Cited

U.S. PATENT DOCUMENTS

| | | | | |
|---|---|---|---|---|
| 7,416,514 | B2 * | 8/2008 | Dell | F16H 59/70 477/80 |
| 8,280,608 | B2 * | 10/2012 | Senda | B60W 10/06 701/101 |
| 8,308,607 | B2 * | 11/2012 | Christen | B60W 30/18018 477/73 |
| 8,880,307 | B2 * | 11/2014 | Iwao | F16H 61/16 701/87 |
| 8,948,965 | B2 * | 2/2015 | Liu | B60W 10/182 303/191 |
| 9,664,169 | B2 * | 5/2017 | Hosaka | F02N 11/103 |
| 10,569,778 | B2 * | 2/2020 | Pedlar | B60W 10/06 |

(Continued)

FOREIGN PATENT DOCUMENTS

| | | | | |
|---|---|---|---|---|
| CN | 100419308 C | * | 9/2008 | ............ B60W 10/02 |
| EP | 1657436 A2 | * | 5/2006 | ...... B60W 30/18018 |

(Continued)

*Primary Examiner* — Kevin R Steckbauer
(74) *Attorney, Agent, or Firm* — Sughrue Mion, PLLC

(57) ABSTRACT

To start an engine while a clutch start cancel switch is ON and a clutch is connected, an electric parking brake ECU releases an electric parking brake regardless of the accelerator position or the clutch stroke, providing that a shift lever is in a drive position, and an engine ECU allows the engine to start after the electric parking brake is released by the electric parking brake ECU.

2 Claims, 5 Drawing Sheets

(56) References Cited

U.S. PATENT DOCUMENTS

| | | | | |
|---|---|---|---|---|
| 11,174,907 B2* | 11/2021 | Kwon | .................... | F16D 48/08 |
| 11,220,265 B2* | 1/2022 | Hesketh | .......... | B60W 30/18027 |
| 2008/0294320 A1* | 11/2008 | Amisano | .......... | B60W 30/18118 |
| | | | | 701/70 |
| 2010/0222973 A1* | 9/2010 | Senda | ................ | B60W 30/192 |
| | | | | 701/68 |
| 2013/0073163 A1* | 3/2013 | Liu | ................ | B60W 30/18027 |
| | | | | 701/70 |
| 2013/0103275 A1* | 4/2013 | Iwao | .................... | F16D 48/066 |
| | | | | 701/68 |
| 2013/0116899 A1* | 5/2013 | Iwao | ...................... | F02D 29/02 |
| | | | | 701/54 |
| 2013/0131948 A1* | 5/2013 | Iwao | .............. | B60W 30/18072 |
| | | | | 477/174 |
| 2013/0138313 A1* | 5/2013 | Iwao | ...................... | B60T 8/172 |
| | | | | 701/67 |
| 2015/0112562 A1* | 4/2015 | Bast | ................... | B60W 30/025 |
| | | | | 701/68 |
| 2016/0230736 A1* | 8/2016 | Hosaka | ................ | F02N 11/103 |
| 2018/0099673 A1* | 4/2018 | Pedlar | .................. | B60W 10/08 |
| 2021/0070297 A1* | 3/2021 | Hesketh | .......... | B60W 30/18118 |
| 2021/0078557 A1* | 3/2021 | Kobune | ................ | B60T 13/741 |
| 2021/0172484 A1* | 6/2021 | Kwon | ................. | F02N 11/0807 |
| 2023/0242116 A1* | 8/2023 | Yamamoto | ........... | B60W 10/06 |
| | | | | 701/70 |

FOREIGN PATENT DOCUMENTS

| | | | | | |
|---|---|---|---|---|---|
| EP | 1657436 B1 | * | 4/2017 | ...... | B60W 30/18018 |
| JP | 11-278091 A | | 10/1999 | | |
| JP | 2002364404 A | * | 12/2002 | .......... | F02N 11/0818 |
| JP | 3596138 B2 | * | 12/2004 | ............ | B60W 10/02 |
| JP | 4080697 B2 | * | 4/2008 | ............ | B60K 6/485 |
| JP | 4552365 B2 | * | 9/2010 | ............ | B60W 10/06 |

* cited by examiner

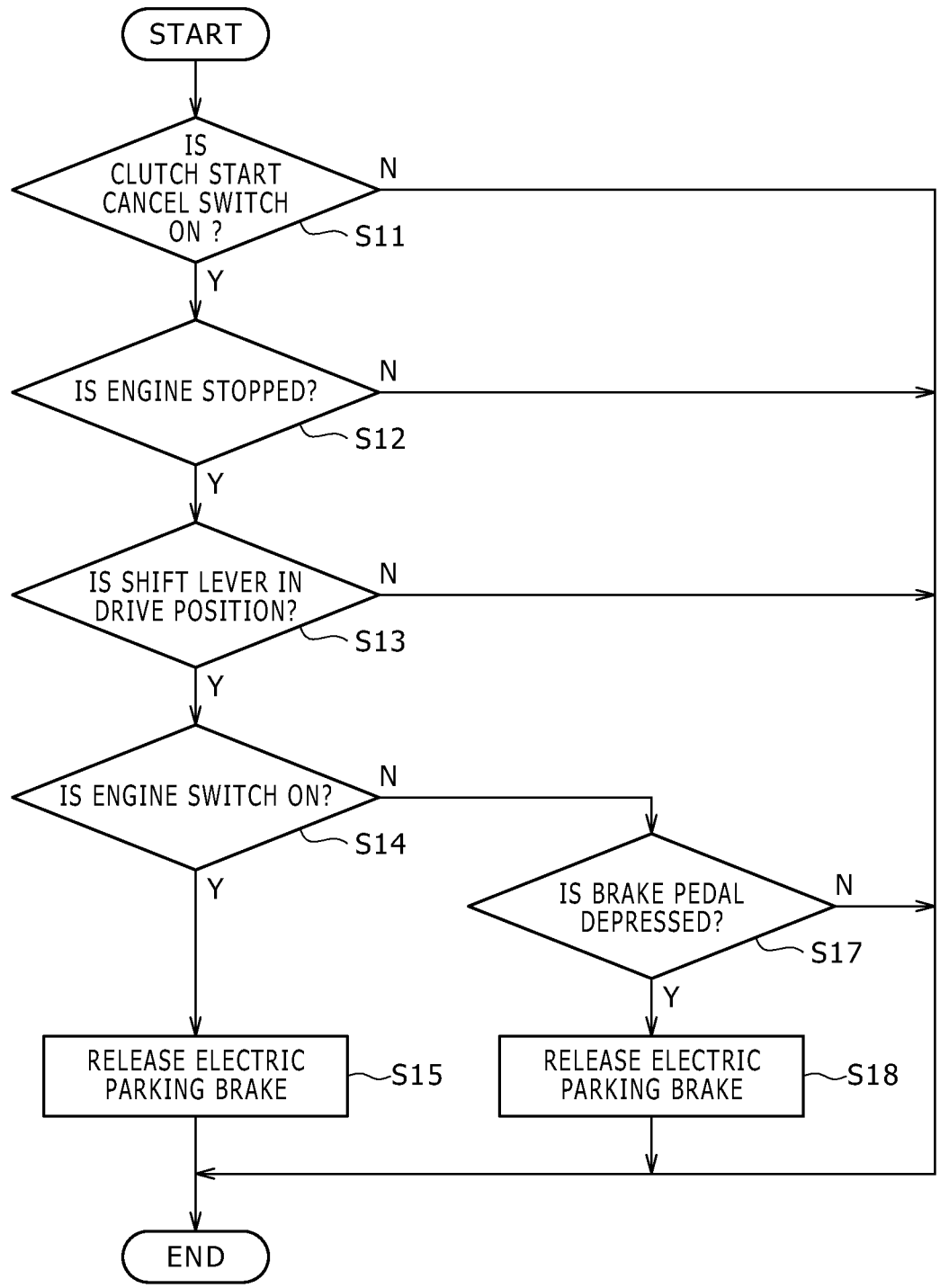

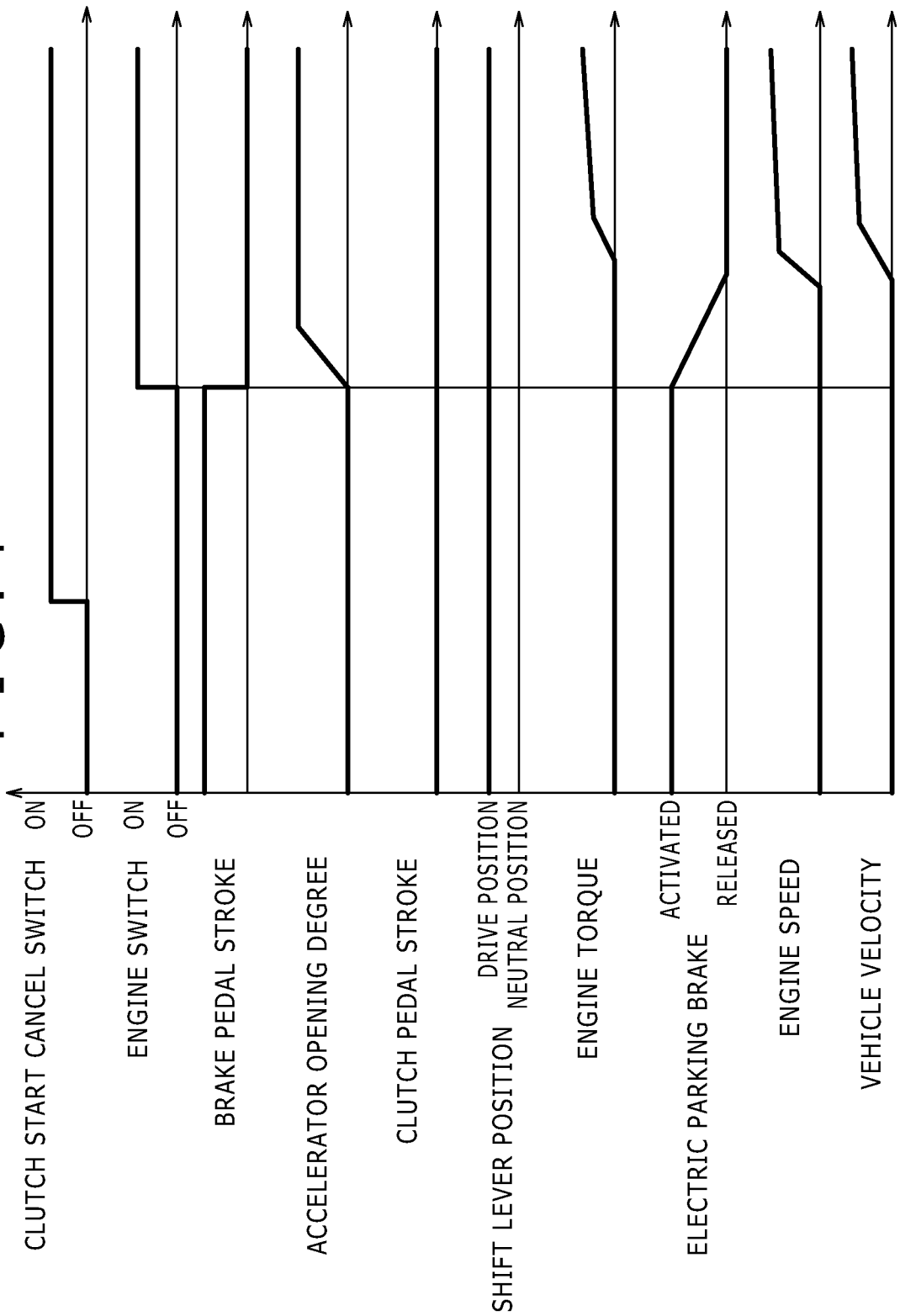

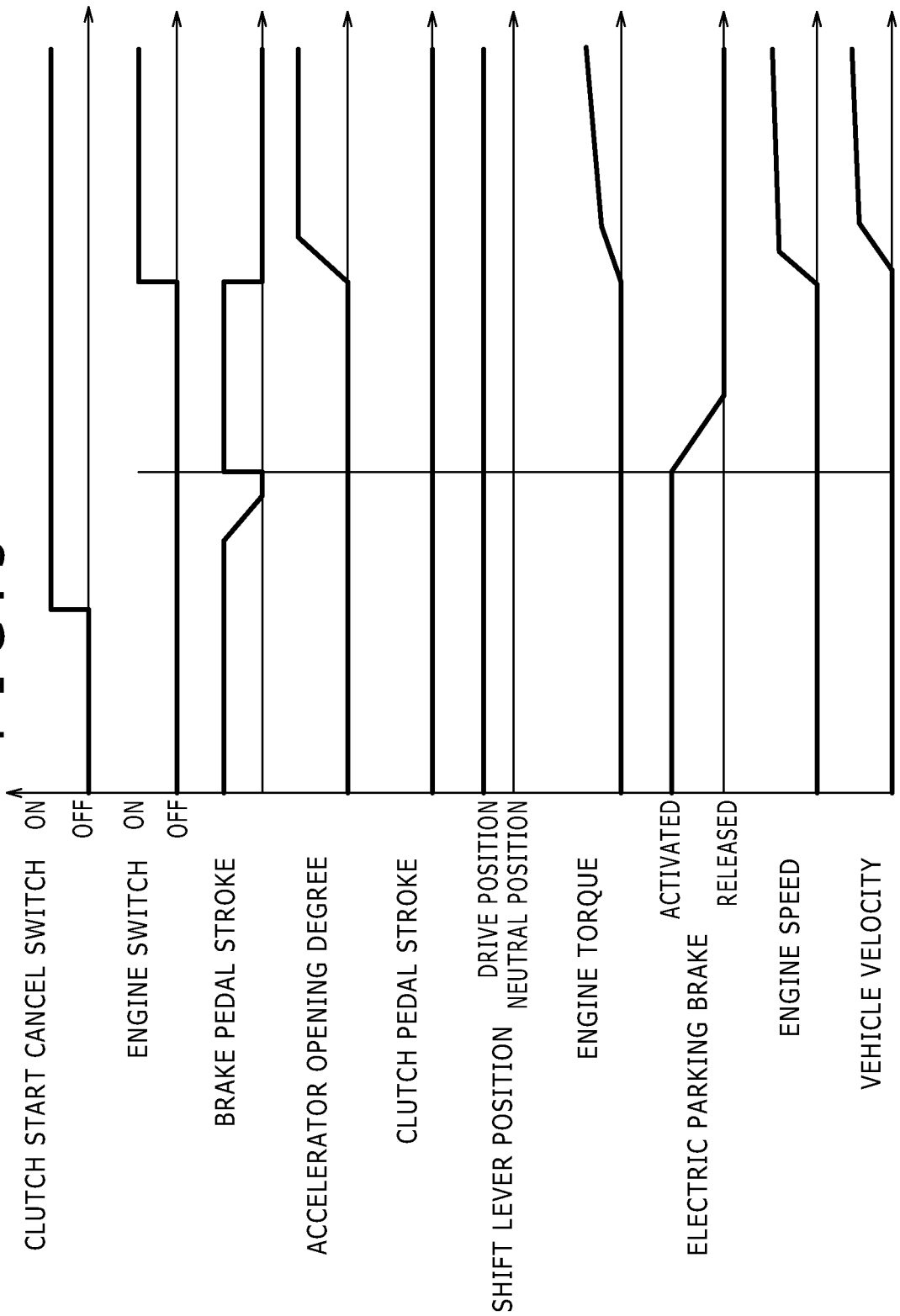

VEHICLE

This application claims priority to Japanese Patent Application No. 2022-014774 filed on Feb. 2, 2022, which is incorporated herein by reference in its entirety including the specification, claims, drawings, and abstract.

TECHNICAL FIELD

The present disclosure relates to a vehicle having an electric parking brake control unit for controlling an electric parking brake and an engine control unit with a clutch start function.

BACKGROUND

An electric parking brake can be activated or released when predetermined conditions are met, or by turning on or off an electric parking brake switch. For example, for a manual transmission car, the electric parking brake is automatically released when a clutch is released and an engine switch is turned on.

Manual transmission vehicles (hereafter referred to as manual vehicles) are provided with a clutch start function. The clutch start function is a function that prevents a starter motor from operating and the engine from starting even if the engine switch is turned on unless the clutch pedal is depressed to start the engine. The clutch start function may be cancelled (for example, JP 11-278091 A).

For example, off-road vehicles perform special driving maneuvers, such as overcoming obstacles, which often cause the engine to stop. This often results in situations where the engine needs to be restarted with the clutch connected. The off-road vehicle therefore has a clutch start cancel switch for canceling clutch start.

CITATION LIST

PATENT LITERATURE: JP 11-278091 A

SUMMARY

For example, for a manual car, when the clutch start cancel switch described above is turned on, the engine will be restarted with the clutch connected. At this time, the electric parking brake will not be released automatically.

Therefore, an object of the present disclosure is to provide a vehicle that can release the electric parking brake automatically even when the clutch start cancel switch is ON.

A vehicle according to the present disclosure includes an electric parking brake control unit that activates an electric parking brake when an engine switch is turned off and releases the electric parking brake when a clutch is released and the engine switch is turned on, and an engine control unit that has a clutch start function of starting an engine when the clutch is released and the engine switch is turned on, and for this vehicle, the vehicle has a clutch start cancel switch for canceling the clutch start function, to start the engine while the clutch start cancel switch is ON and the clutch is connected, the electric parking brake control unit releases the electric parking brake regardless of the accelerator position or the clutch stroke, providing that a shift lever is in a drive position, and the engine control unit allows the engine to start after the electric parking brake is released by the electric parking brake control unit.

A vehicle according to the present disclosure includes an electric parking brake control unit that activates an electric parking brake when an engine switch is turned off and releases the electric parking brake when a clutch is released and the engine switch is turned on, and an engine control unit that has a clutch start function of starting an engine when the clutch is released and the engine switch is turned on, and for this vehicle, the vehicle has a clutch start cancel switch for canceling the clutch start function, and when the clutch start cancel switch is ON and the clutch is connected, the electric parking brake control unit releases the electric parking brake regardless of the accelerator position or the clutch stroke, providing that a shift lever is in a drive position and that a brake pedal is depressed.

The vehicle of the present disclosure can release an electric parking brake automatically even when the clutch start cancel switch is ON.

BRIEF DESCRIPTION OF DRAWINGS

An embodiment of the present disclosure will be described based on the following figures, wherein:

FIG. 3 is a flowchart showing the operations of an electric parking brake control unit;

FIG. 4 is a timing diagram showing the operations of the electric parking brake control unit; and FIG. 5 is another timing diagram showing the operations of the electric parking brake control unit.

DESCRIPTION OF EMBODIMENTS

An illustrative embodiment of the present disclosure will be described in detail hereinafter. In the description below, specific shapes, materials, directions, numerical values, etc. are provided as illustrations for facilitating the understanding of the present disclosure, and can be appropriately changed according to applications, purposes, specifications, etc.

"Vehicle"

A vehicle 10 according to the illustrative embodiment will be described with reference to FIGS. 1 and 2.

The vehicle 10 is an off-road manual vehicle driven by an engine. For the vehicle 10, it is possible to automatically release an electric parking brake 13 even when a clutch start cancel switch 22 is ON, which will be described in detail below.

Figure 1:
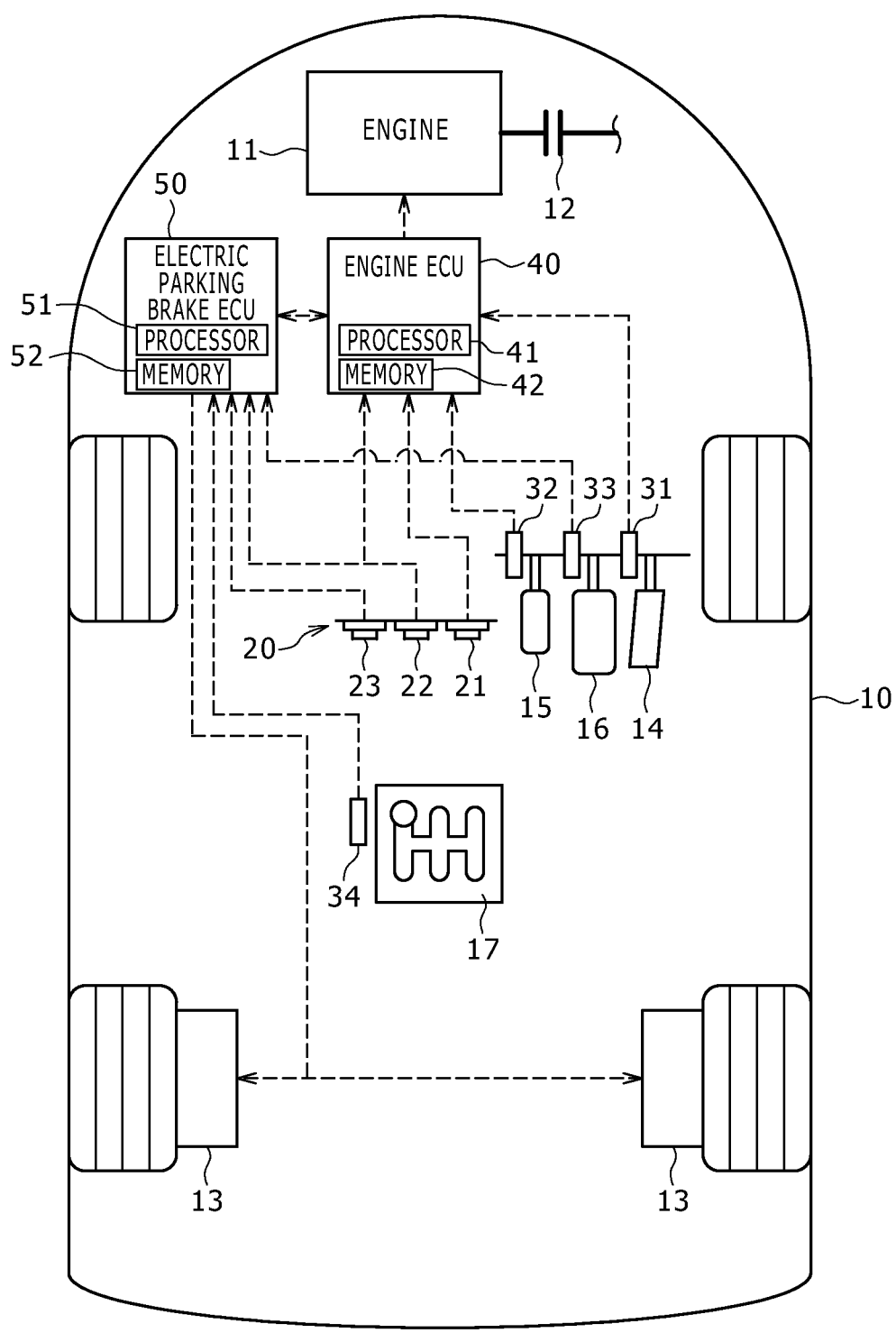
FIG. 1 is a schematic view showing a structure of a vehicle according to an illustrative embodiment.

As shown in FIG. 1, the vehicle 10 is provided with a drive engine 11, an engine electronic control unit (ECU) 40 serving as an engine control unit that controls the start and stop of the engine 11 as described in detail below, the electric parking brake 13 that is electrically operated, and an electric parking brake ECU 50 as an electric parking brake control unit that controls the activation and release of the electric parking brake 13 as described in detail below.

The vehicle 10 also has an accelerator pedal 14 serving as an acceleration device, a clutch pedal 15 for operating a clutch 12 that connects and disconnects a transmission (not shown) from the engine 11, a brake pedal 16 for actuating a foot brake, a shift lever 17 for switching gear combinations for manual transmission, and an operation section 20 which will be described in detail below.

The clutch pedal 15, the brake pedal 16, and the accelerator pedal 14 are arranged in this order from left to right at the driver's foot. The shift lever 17 is located in a console box between the driver's seat and the passenger seat.

The operation section 20 has an engine switch 21 that can start and stop the engine 11, the clutch start cancel switch 22 that can cancel the setting of a clutch start function, and an electric parking brake switch 23 that can activate and release the electric parking brake 13. The clutch start function is a function that allows the engine switch 21 to start the engine 11 when the clutch pedal 15 is depressed and the clutch 12 is released.

The vehicle 10 is further provided with an accelerator position sensor 31 for detecting the opening degree of the accelerator pedal 14, a clutch pedal stroke sensor 32 for detecting the stroke of the clutch pedal 15, a brake pedal stroke sensor 33 for detecting the stroke of the brake pedal 16, and a shift lever position sensor 34 for detecting a position of the shift lever 17.

"Engine ECU"

Figure 2:
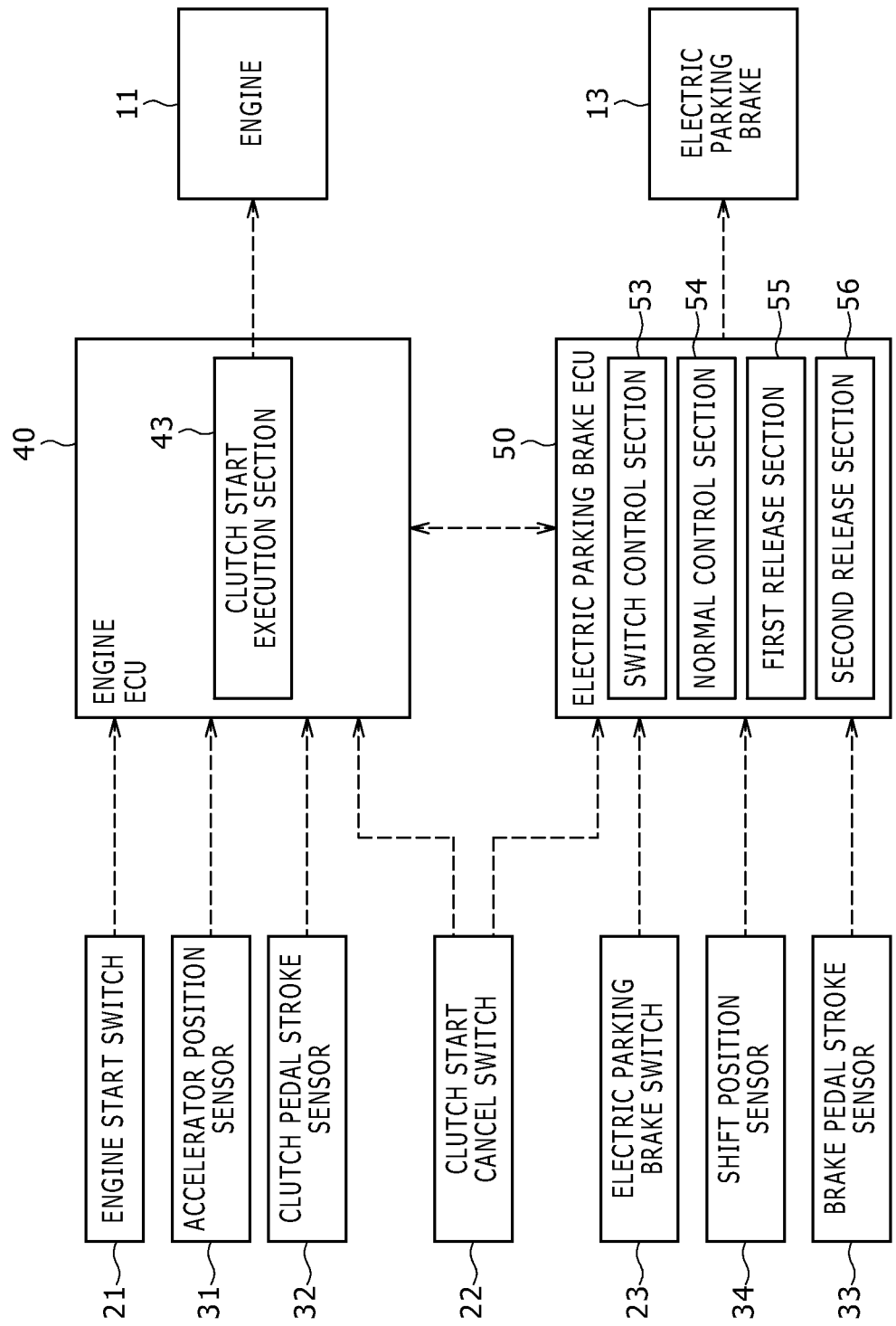
FIG. 2 is a block diagram showing the structure of the vehicle according to the illustrative embodiment.

As shown in FIGS. 1 and 2, the engine ECU 40 controls the start and stop of the engine 11. The engine ECU 40 includes a processor 41 with a CPU, and a memory 42 that stores a control program, control data, and the like. The memory 42 is, for example, a RAM, a ROM, a flash memory, or the like. The processor 41 operates according to the control program stored in the memory 42, thereby controlling the start and stop of the engine 11.

The engine ECU 40 is connected to the engine 11, the engine switch 21, the clutch start cancel switch 22, the accelerator position sensor 31, and the clutch pedal stroke sensor 32.

The engine ECU 40 has a clutch start execution section 43 that executes the clutch start function of starting the engine 11 when the clutch pedal 15 is depressed to release the clutch 12 and the engine switch 21 is turned on, as described above. The clutch start execution section 43 is enabled by the processor 41 executing the program stored in memory 42.

The clutch start execution section 43 is deactivated by turning on the clutch start cancel switch 22. In other words, the engine ECU 40 does not execute the clutch start function when the clutch start cancel switch 22 is ON.

"Electric Parking Brake ECU"

As shown in FIGS. 1 and 2, the electric parking brake ECU 50 controls the activation and release of the electric parking brake 13. The electric parking brake ECU 50 includes a processor 51 with a CPU, and a memory 52 that stores a control program, control data, and the like. The memory 52 is, for example, a RAM, a ROM, a flash memory, or the like. The processor 51 operates according to the control program stored in the memory 52, thereby controlling the activation and release of the electric parking brake 13.

The electric parking brake ECU 50 is connected to the electric parking brake 13, the clutch start cancel switch 22, the electric parking brake switch 23, the brake pedal stroke sensor 33, and the shift lever position sensor 34.

The electric parking brake ECU 50 has a switch control section 53, a normal control section 54, a first release section 55, and a second release section 56, each of which will be described in detail below. The switch control section 53, the normal control section 54, the first release section 55, and the second release section 56 are enabled by the processor 51 executing the program stored in the memory 52.

The switch control section 53 activates the electric parking brake 13 when the electric parking brake switch 23 is turned on and releases the electric parking brake 13 when the electric parking brake switch 23 is turned off.

The normal control section 54 activates the electric parking brake 13 when the engine switch 21 is turned off and releases the electric parking brake 13 when the clutch 12 is released and the engine switch 21 is turned on.

When the engine switch 21 is turned on (to start the engine 11) while the clutch start cancel switch 22 is ON and the clutch 12 is connected, the first release section 55 releases the electric parking brake 13 regardless of the accelerator position or the clutch stroke, providing that the shift lever 17 is in a drive position. The drive position of the shift lever 17 refers to any position other than the neutral position.

Here, the above normal control section 54 cannot release the electric parking brake 13 to start the engine 11 when the clutch start cancel switch 22 is ON and the clutch 12 is connected. However, the first release section 55 can automatically release the electric parking brake 13 to start the engine 11 even when the clutch start cancel switch 22 is ON and the clutch 12 is connected.

For example, off-road vehicles perform special driving maneuvers, such as overcoming obstacles, which often cause the engine 11 to stop. This often results in situations where the engine 11 needs to be restarted with the clutch 12 connected. In such a case, the first release section 55 can release the electric parking brake 13.

When the clutch start cancel switch 22 is ON and the clutch 12 is connected, the second release section 56 releases the electric parking brake 13 regardless of the accelerator position or the clutch stroke, providing that the shift lever 17 is in the drive position and that the brake pedal 16 is depressed greater than or equal to a predetermined stroke length.

The second release section 56 can automatically release the electric parking brake 13 even when the clutch start cancel switch 22 is ON and the clutch 12 is connected.

For example, off-road vehicles perform special driving maneuvers, such as overcoming obstacles, which often cause the engine 11 to stop. This often results in situations where the engine 11 needs to be restarted with the clutch 12 connected. In such a case, the second release section 56 can release the electric parking brake 13 before the engine 11 is restarted.

The operations of the electric parking brake ECU 50 will be described with reference to FIGS. 3 and 5. In the following, the operations of automatically releasing the electric parking brake 13 by the above first and second release sections 55 and 56 will be explained.

As shown in FIG. 3, in step S11, it is checked whether the clutch start cancel switch 22 is ON. If the clutch start cancel switch 22 is ON, processing proceeds to step S12.

In step S12, it is checked whether the engine 11 is stopped. If the engine 11 is stopped, processing proceeds to step S13. In step S13, it is checked whether the shift lever 17 is in the drive position. If the shift lever 17 is in the drive position, processing proceeds to step S14. The drive position of the shift lever 17 refers to any position other than the neutral position.

In step S14, it is checked whether the engine switch 21 is ON. If the engine switch 21 is ON, processing proceeds to step S15. If the engine switch 21 is not ON, processing proceeds to step S17.

In step S15, the electric parking brake 13 is released.

In step S17, it is checked whether the brake pedal 16 is depressed greater than or equal to a predetermined stroke length. If the brake pedal 16 is depressed greater than or equal to the predetermined stroke length, processing proceeds to step S18. In step S18, the electric parking brake 13 is released.

As shown in FIG. 4, when the engine switch 21 is turned on (step S14) while the clutch start cancel switch 22 is ON (step S11) and the clutch 12 is connected, the first release section 55 can release the electric parking brake 13 (step S15) regardless of the accelerator position or the clutch stroke, providing that the shift lever 17 is in the drive position (step S13). The engine then starts, and the engine speed increases as the accelerator opening degree increases.

As shown in FIG. 5, when the clutch start cancel switch 22 is ON (step S11) and the clutch 12 is connected, the second release section 56 can release the electric parking brake 13 (step S18) regardless of the accelerator position or the clutch stroke, providing that the shift lever 17 is in the drive position (step S13) and that the brake pedal 16 is depressed greater than or equal to the predetermined stroke length (step S17). The engine switch 21 is then turned on, and the engine speed increases as the accelerator opening degree increases.

The present disclosure is not limited to the above embodiment and its variations, and, as a matter of course, various modifications and improvements can be made without departing from the scope of the claims herein.

The invention claimed is:

1. A vehicle comprising:

an electric parking brake control unit that activates an electric parking brake when an engine switch is turned off and releases the electric parking brake when a clutch is released and the engine switch is turned on; and an engine control unit that has a clutch start function of starting an engine when the clutch is released and the engine switch is turned on, wherein the vehicle has a clutch start cancel switch for canceling the clutch start function, to start the engine while the clutch start cancel switch is ON and the clutch is connected, the electric parking brake control unit releases the electric parking brake regardless of the accelerator position or the clutch stroke, providing that a shift lever is in a drive position, and the engine control unit allows the engine to start after the electric parking brake is released by the electric parking brake control unit.

2. A vehicle comprising:

an electric parking brake control unit that activates an electric parking brake when an engine switch is turned off and releases the electric parking brake when a clutch is released and the engine switch is turned on; and an engine control unit that has a clutch start function of starting an engine when the clutch is released and the engine switch is turned on, wherein the vehicle has a clutch start cancel switch for canceling the clutch start function, when the clutch start cancel switch is ON and the clutch is connected, the electric parking brake control unit releases the electric parking brake regardless of the accelerator position or the clutch stroke, providing that a shift lever is in a drive position and that a brake pedal is depressed.

* * * * *